(12) United States Patent
Burger et al.

(10) Patent No.: US 10,195,645 B2
(45) Date of Patent: Feb. 5, 2019

(54) METHOD FOR PRODUCING A SCREENING DEVICE

(71) Applicant: Voith Patent GmbH, Heidenheim (DE)

(72) Inventors: Ralf Burger, Böhmenkirch (DE);
Oliver Zavornik, Giengen/Brz. (DE);
Ivica Zavornik, Giengen/Brz. (DE);
Werner Brettschneider, Grünkraut (DE)

(73) Assignee: Voith Patent GmbH, Heidenheim (DE)

( * ) Notice: Subject to any disclaimer, the term of this patent is extended or adjusted under 35 U.S.C. 154(b) by 84 days.

(21) Appl. No.: 15/352,093

(22) Filed: Nov. 15, 2016

(65) Prior Publication Data

US 2017/0056930 A1    Mar. 2, 2017

Related U.S. Application Data

(63) Continuation of application No. PCT/EP2015/058389, filed on Apr. 17, 2015.

(30) Foreign Application Priority Data

May 15, 2014 (DE) .......... 10 2014 209 200

(51) Int. Cl.
*B07B 1/46* (2006.01)
*B01D 29/44* (2006.01)
(Continued)

(52) U.S. Cl.
CPC .......... *B07B 1/4618* (2013.01); *B01D 29/445* (2013.01); *B07B 1/18* (2013.01); *D21D 5/16* (2013.01)

(58) Field of Classification Search
CPC .......... B07B 1/18; B07B 1/20; B07B 1/4618; D21D 5/16; B01D 29/445
See application file for complete search history.

(56) References Cited

U.S. PATENT DOCUMENTS

| 2007/0199362 A1 | 8/2007 | Lange |
| 2010/0263819 A1 | 10/2010 | Maurais |
| 2011/0005981 A1 | 1/2011 | Hetu |

FOREIGN PATENT DOCUMENTS

| DE | 39 27 748 A1 | 2/1991 |
| DE | 10 2006 008 172 A1 | 8/2007 |
| WO | 03/028846 A1 | 4/2003 |

OTHER PUBLICATIONS

Notice of Transfer of International Research Report and the Written Notice Issued for International Searching Authority or Statement dated Oct. 9, 2015 for International Application No. PCT/EP2015/058389 (13 pages).

(Continued)

*Primary Examiner* — Joseph C Rodriguez
*Assistant Examiner* — Kalyanavenkateshware Kumar
(74) *Attorney, Agent, or Firm* — Taylor IP, P.C.

(57) ABSTRACT

A method for producing a screening device, the method comprising the steps of providing a screening device that includes a plurality of profiled bars and a plurality of bar holder packages associated with the plurality of profiled bars. The plurality of bar holder packages include a plurality of first bar holders and at least one additional bar holder associated with the plurality of first bar holders. The method including the further steps of inserting the plurality of profiled bars parallel to one another into the plurality of bar holder packages, and bending the plurality of bar holder packages such that the plurality of first bar holders and the at least one additional bar holder are bent at the same time.

15 Claims, 1 Drawing Sheet

(51) Int. Cl.
*B07B 1/18* (2006.01)
*D21D 5/16* (2006.01)

(56) References Cited

OTHER PUBLICATIONS

Examination of Application dated Sep. 22, 2014 for German Patent Application No. DE 10 2014 209 200.0 (5 pages).

METHOD FOR PRODUCING A SCREENING DEVICE

CROSS REFERENCE TO RELATED APPLICATIONS

This is a continuation of PCT application No. PCT/EP2015/058389, entitled "METHOD FOR PRODUCING A SCREENING DEVICE", filed Apr. 17, 2015, which is incorporated herein by reference.

BACKGROUND OF THE INVENTION

1. Field of the Invention

The present invention relates to a method for producing a rotationally symmetrical screening device.

2. Description of the Related Art

Screening devices may be used for example for screening of fibrous stock suspensions, as is done in pressure screens in the paper industry. The fibers that are contained in the suspension are to hereby penetrate through the screen, whereas the undesirable solid components are rejected at the gap and are directed out of the screen device.

Due to the fact that the openings are essentially longitudinal, in other words are slots or gaps, fibrous particles pass easier if both types are present in similar dimensions. With this type of screening technology very effective discharging of non-fibrous contaminants from the fibrous stock suspension is thus made possible. Also conceivable is utilization for separating of different fibrous components—a so-called fiber fractioning. However, a prerequisite herein is high precision of the slot size across the entire screen surface. For stringent requirements, cylindrical screening devices in the embodiment of so-called screen baskets are mostly used.

The screening devices can either be arranged for centrifugal operation with a suspension flow from the inside toward the outside and with profiled bars inserted on the inside edge of the bar holders, or for a centripetal operation with a suspension flow from the outside toward the inside and with profiled bars inserted on the outside edge of the bar holders. With screening devices for centrifugal operation which have bar holders arranged on the outside and profiled bars arranged on the inside, the curvature radius of the bar holders is generally greater when inserting the profiled bars than the radius of curvature of the screen cylinder. Subsequently the radius of curvature of the bar holders is reduced for wedging of the profiled bars. In the case of centripetal operation with bar holders arranged on the inside and profiled bars arranged on the outside the radius curvature of the bar holders during insertion of the profiled bars is generally less than the radius of curvature of the screen cylinder. Subsequently the radius of curvature of the bar holders is increased for wedging of the profiled bars.

To produce screening devices for a centrifugal operation, straight bar holders are generally produced initially and the profiled bars are inserted into these bar holders. The bar holders with the inserted profiled bars are subsequently bent into an open C-shape. Finally, the bar holders are formed into closed rings and their two abutment ends are firmly connected with one another. A method of this type is described for example in DE 39 27 748 A1.

In contrast, to produce screening devices for centripetal operation, curved bar holders consisting of several segments are generally produced initially, whose radius of curvature is less than that of the finished screening device. After the profiled bars are inserted into these bar holders, rings are formed, whereby the radius of curvature of the bar holders is enlarged through reshaping, as a result of which the recesses narrow again, thus wedging the profiled bars. The two abutment ends of the bar holders are subsequently again connected firmly with one another. A relevant method is described for example in DE 10 2006 008 172 A1.

Conventional screening devices for centrifugal operation with merely wedged profiled bars may be usable only to a limited extent, depending upon the respectively used rotor or the respective application. The profiled bars were therefore welded together with the annular bar holders. During operation however failures occurred in a multitude of screening devices within a very short period of time, the reason for which is found in the welding process.

In the case of screening devices designed for centripetal operation where the profiled bars were also welded together with the annular bar holders the same problems occurred as did with the screening devices designed for centrifugal operation. In one initially only wedged version that was arrived at through pre-bending, sufficient wedging was not achieved. Also, breaks occurred with this version. An additional problem with some screening devices results in connection with the attachment of the ferrules of the screening device or respectively screen baskets, regardless of whether the profiled bars are welded together with the bar holders or not. The main stress during operation of the screening device may occur most strongly in the region of the welded seam at the ferrule, since this is also the force transfer point with the greatest tension stress. This too represents a permanent weak point that repeatedly leads to the ferrules breaking off the perforated screen at this location. The reason for this is also based in the welding process.

US 2011/0005 981 A1 describes an alternative cylindrical screening device wherein at least one additional strip-like bar holder with recesses that are open at the edges is inserted in addition to the first strip-like bar holders.

With some prior art methods and screening devices, the described stability problems entail restrictions during use for certain rotors, rotor speeds and design variations.

What is needed in the art is a method as well as a screening device in which the previously discussed problems are eliminated. Such a method is intended to produce screening devices, in particular screen baskets having optimum strength as simply as possible and accordingly cost effectively and without the requirement to weld the profiled bars to the bar holders. With optimum strength and accordingly greater breakage resistance and durability such screening devices are intended in particular for use in more varied applications. Moreover, the risk of breakage in the region of the welding areas between the ferrules and the profiled bar bond is to be minimized as much as possible.

SUMMARY OF THE INVENTION

The present invention relates to a method for producing a rotationally symmetrical screening device, in particular a cylindrical screening device having a plurality of profiled bars, whereby first strip-like bar holders are produced, the shape of which deviates from the later annular shape in the finished screening device and which have recesses that are open at the edges into which the profiled bars can be inserted. The profiled bars are inserted parallel to one another into the recesses of the first bar holders that are open at the edges. Rings are produced from the first bar holders that are fitted with the profiled bars by bending, due to the bending the profile bars are wedged into the narrowing recesses and after bending the first bar holders are firmly connected to one another at both their abutment ends.

The invention further relates to a screening device produced by such method, in particular a screen basket, for example for a pressure screen that can be utilized in the paper industry as well as to a screening device, in particular a screen basket for example for a pressure screen that can be utilized in the paper industry, having a plurality of profiled bars that are inserted, wedged parallel to one another in the recesses that are open at the edges in strip-like bar holders that were bent into rings and whose two abutting ends are firmly connected with one another.

The present invention relates to a method for producing a rotationally symmetrical screening device. The present invention provides a method in that at least one additional respective strip-like bar holder having recesses that are open at the edges is produced in each case in addition to the first strip-like bar holders, whose shape deviates from the subsequent annular shape in the first screening device, and whose height measured in the radial direction of the subsequent annular shape is less than the height of the respective first bar holder. The method also provides that the first strip-like bar holders and the further strip like bar holders associated therewith are used to form bar holder packages, each consisting of one first strip-like bar holder and at least one additional strip-like bar holder that directly adjoins or is spaced apart therefrom in axial direction of the finished screening device, and in that the profiled bars are inserted parallel to one other into the recesses of the bar holder packages that are open at the edges. When the first bar holders are bent, the further bar holders are bent at the same time, thereby wedging the profiled bars also in the recesses of these additional bar holders due to the narrowing of the recesses of the additional bar holders, and in that after bending the bar holder packages are firmly connected with one another at both their abutment ends.

The method of the present invention is suitable for producing screening devices for centrifugal operation as well as for producing screening devices for centripetal operation.

By providing at least twice or double the bar holders that have a different height according to the invention offset wedging is achieved, thereby providing the screening devices with greater strength, so that they are more durable and no longer break so soon. Even without the requirement of welding the profiled bars to the bar holders, as well as without soft or hard welding, adhesive bonding, etc., great strength of the screening devices or respectively the screen baskets is achieved, solely through wedging of the profiled bars in the recesses of the bar holders. The screening devices are accordingly more versatile and respectively suitable for a wider range of applications without having to accept the aforementioned risks, in particular breaks or similar defects.

At least one bar holder package can be formed for example from a first bar holder and an additional bar holder. At least one bar holder package can however also be formed for example from one first bar holder and two additional bar holders. Herein, all additional bar holders of a respective bar holder package may be of a lower height than the first bar holder of the respective bar holder package.

The bar holders of a respective bar holder package are placed axially directly adjoining or spaced apart in axial direction of the screening device that is to be produced, whereupon the screen mat can be fitted as described with the profiled bars. Due to the lower height of the additional bar holders the thus created screen mat can for example be pre-shaped as previously on a 3-roll mill with grooves that are introduced for bar holders. Due to the lower height of the additional bar holders the screen mat fits also into the previously used hydraulic cylinders by which the ends of the higher first bar holder can be held hydraulically, pulled together under tension and welded. The additional lower height bar holders are thereby "dragged along".

Due to the difference in length created as a result of the different neutral fibers, different wedging and a "distortion effect" occur at the bar holder package. Also between the, for example, laser cut bar holder recesses and the profiled bars, length changes of different dimensions may occur, leading to a mutual distortion. Due to this effect and the additional greater bar holder thickness an extremely stable screening device or respectively an extremely stable screen basket having high clamping force is the result.

The strip-like bar holders can for example be produced by laser cutting. The respective additional bar holders may be designed to be of lesser height than the first bar holders. Consequently, during further processing, for example by a combined bending-welding machine the additional bar holders are non-obstructive and fit into the relevant devices without any problems.

In certain cases it may be advantageous if the bar holders of at least one bar holder package are manufactured from the same material.

It is however also conceivable to produce the bar holders of at least one bar holder package at least partially from a different material. The bar holders of at least one bar holder package can thereby be produced at least partially from a different material, in order to provide the bar holders at least partially with different expansion-, tensile strength- and/or frictional properties.

In addition, the bar holders of at least one bar holder package may have a different thickness, at least partially, measured in axial direction of the finished screening device. However, they also may be the same thickness.

As already mentioned, the first strip-like bar holders can be bent into rings by bending devices in the previously described manner, and the additional strip-like bar holders that are associated with the first strip-like bar holders can be dragged along via the profiled bars that are inserted into the recesses of the bar holder packages that are open on the edges and can thus also be bent into rings. The first strip-like bar holders can in particular be wedged into the bending devices when being bent into rings. Finally, the bar holder packages are connected with one another at both their abutment ends by welding.

Bending of the bar holder packages and joining of the two abutment ends of the bar holder packages can be implemented in the same machine, in particular in a combination bending and welding machine. The different approach in producing screening devices for centrifugal operation and for screening devices for centripetal operation was already discussed previously. In principle, the method according to the invention may be used for producing both types of screening devices or respectively screen baskets. A respective screening device can for example comprise two or also more bar holder packages in axial direction of the screening device and at a distance from one another.

Further, an additional alternative of a method according to the invention provides that in addition to the two first strip-like bar holders that are to be positioned in the finished screening device in the region of a face side ferrule of the screening device there may be one additional strip-like bar holder with recesses that are open on the edges whose shape deviates from the subsequent annular shape in the finished screening device. The height of the additional strip-like bar holder measured in the radial direction of the subsequent annular shape is less than the height of the respective first bar holder. The respective first strip-like bar holders and the further strip-like bar holders associated therewith are used to form bar holder packages, each consisting of one first strip-like bar holder and one further strip-like bar holder that directly adjoins the first strip-like bar in the axial direction of the finished screening device, located between the first strip-like bar holder and the respective ferrule, and in that the profiled bars are inserted parallel to each other into the recesses of the bar holder packages that are open at the edges. When the first bar holders are bent, the further bar holders are bent at the same time, thereby wedging the profiled bars also occurs in the recesses of the further bar holders due to the narrowing of the further bar holders, and in that after bending the bar holder packages are firmly connected with one another at both their abutment ends. The additional bar holder of a respective bar holder package is subsequently fitted backlash-free into an indentation of the respective ferrule and is welded together with the ferrule, wherein the first bar holder of a respective bar holder package is in contact with the inside face of the respective ferrule and is welded together with the ferrule in the region of its edge facing away from the profiled bars.

For the production of a centrifugally operable screening device with profiled bars that are inserted on the inside edge of the bar holders, the additional bar holder of a respective bar holder package can be welded together with the respective ferrule by a welding seam in the region of the inside diameter of the respective ferrule, and the bar holder of a respective bar holder package via a seal seam in the region of its outside diameter.

The heat-affected zone of the main welding seam thereby reaches deeper into the respective ferrule, and the deforming force of the profiled bars acts more strongly during operation in the screening device upon the non-welded wedging point in the bar holder package or on the first bar holder of greater or normal height. The welding seam is hereby clearly relieved, whereby also the notch effect is less effective due to a clearly reduced load. Consequently, in particular the risk of breakage in the area of the welding region between the ferrules and the profiled bar connection may be reduced to a minimum.

This second alternative of a method according to the invention can be combined with the first alternative of a method according to the invention, or can be used separately. This means that the bar holder packages according to the invention in the region of the ferrules according to the second inventive alternative are may be usable individually, without necessarily having to provide additional inventive bar holder packages. As already mentioned, a combination of both alternatives of the method according to the invention is also conceivable.

Both variations of the method according to the invention are suitable for producing screening devices for centrifugal operation as well as for producing screening devices for centripetal operation. When producing screening devices for centripetal operation, screen baskets may also be produced according to the "drag-strip" principle on a bending-/welding machine. Here, profiled bars consisting of segments that initially have a smaller radius of curvature may be bent. In this case too, bar holder packages are formed from first and additional bar holders, whereby the additional bar holders during pre-bending of the first bar holders are again "dragged along" accordingly. The bar holder packages may be tensioned on a bending-/welding machine. The same effect of distortion may occur based on the occurring length difference or respectively the different neutral fibers. For screening devices for centrifugal operation and screening devices for centripetal operation the connectivity of the ferrule can be implemented analogously in the described manner.

A first alternative for a screening device according to the invention, for example a screen basket for a pressure screen that can be utilized in the paper industry is characterized in that it is produced by a method according to the invention. The advantages of such an inventive screening device result from the advantages that have already been mentioned in the context of the method according to the invention.

Based on a screening device of the type discussed at the beginning, in other words a screening device, in particular a screen basket for a pressure screen that can be utilized in the paper industry having a plurality of profiled bars that are inserted parallel to one another, wedged into recesses that are open at the edges of first strip-like bar holders that are bent into rings, whose two abutment ends are connected firmly with one another, an additional alternative of a screening device according to the invention is characterized in that in addition to the first bar holders there may be at least one further strip-like bar holder having recesses that are open at the edges and that is bent into a ring and whose radial height is less than the height of the respective first bar holder. The first bar holders and the additional bar holders associated therewith form bar holder packages, each consisting of one first bar holder and at least one additional bar holder that directly adjoins or is spaced apart therefrom in the axial direction of the finished screening device. The profiled bars are inserted parallel to one another, wedged in the recesses of the bar holder packages that are open at the edges, whereby the profiled bars are also wedged in the recesses of the additional bar holders, and in that the bent over bar holder packages are connected firmly with one another at both their abutment ends. A screening device of this type may also be produced by an inventive method. The advantages of such an inventive screening device result again directly from the advantages that have already been mentioned in the context of the method according to the invention.

Further based on the screening device of the type discussed at the beginning, in other words a screening device, in particular a screen basket for a pressure screen that can be utilized in the paper industry having a plurality of profiled bars that are inserted parallel to one another, wedged into recesses that are open at the edges of first strip-like bar holders that are bent into rings, whose two abutment ends are connected firmly with one another, an additional alternative of a screening device according to the invention is characterized in that in addition to the two first bar holders that are to be positioned in the region of a respective face side ferrule of the screening device there may be one additional bar holder that is bent into a ring and which has recesses that are open on the edges. The radial height of the additional bar holder is less than the height of the respective first bar holder. The respective first bar holders and the additional bar holders associated therewith form bar holder packages, each consisting of one first bar holder and one additional bar holder that directly adjoins or is spaced apart therefrom at a certain distance in the axial direction, located between the first bar holder and the respective ferrule. The profiled bars are inserted parallel to each other into the recesses of the bar holder packages that are open at the edges and wedged, whereby the profiled bars are also wedged in the narrowed recesses of the additional bar holders that are bent into rings. The bent bar holder packages are firmly connected at their two abutment ends. The additional bar holder of a respective bar holder package is fitted backlash-free into an indentation of the respective ferrule and is welded together with the ferrule and the first bar holder of a respective bar holder package is in contact with the inside face of the respective ferrule and is welded together with the ferrule in the region of its edge facing away from the profiled bars.

This version of an inventive screening device can be used in combination with at least one of the previously discussed variations of an inventive screening device, or separately. The advantages of such an inventive screening device result again from the advantages that have already been discussed in the context of the method according to the invention.

In a case where the screening device is intended for centrifugal operation, in other words in cases where the suspension flow is directed from the inside to the outside and where the profiled bars are inserted on the inside edge of the bar holders it may be that the additional bar holder of a respective bar holder package is welded together with the respective ferrule via a welding seam in the region of the inside diameter of the respective ferrule, and the first bar holder of a respective bar holder package via a seal seam in the region of its outside diameter.

The advantages of this embodiment result again from the advantages that have already been discussed in the context of the relevant method.

At least one bar holder package of a respective variation of an inventive screening device can consist of one first bar holder and one additional bar holder, or of one first bar holder and two additional bar holders, whereby the additional bar holders have a lower height than the first bar holder. The strip-like bar holders can for example be produced by laser cutting. The bar holders of at least one bar holder package can be produced from the same material or at least partially from a different material. In the latter case the bar holders of at least one bar holder package can be produced at least partially from a different material, and can therefore have at least partially different expansion-, tensile strength- and/or frictional properties.

The bar holders of at least one bar holder package of a respective version of an inventive screening device can have the same thickness measured in the axial direction of the screening device, or can also have a different thickness. The bar holder packages can be connected with one another in particular through welding.

Perforated strips having cylindrical and/or conical screening openings can for example also be inserted between the profiled bars.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
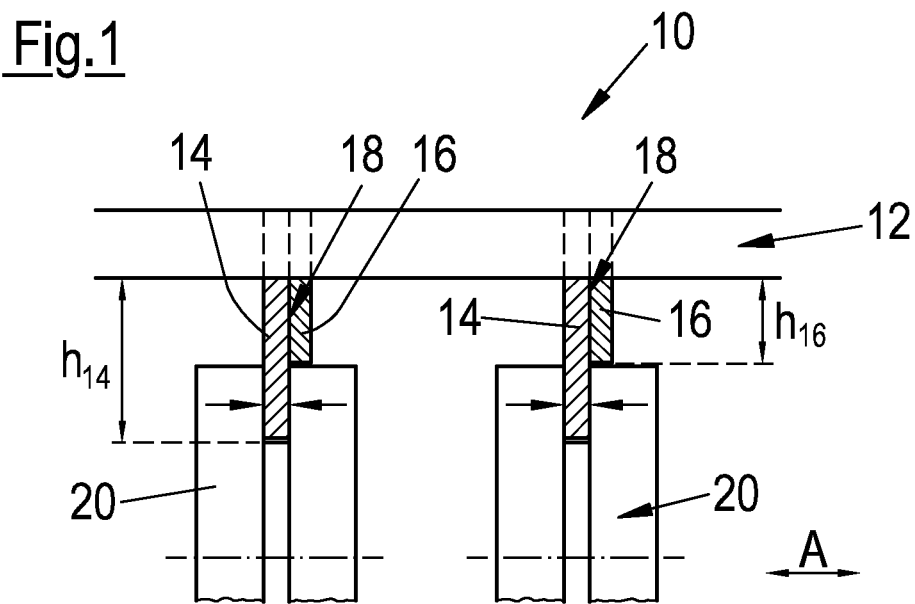
FIG. 1 is a schematic sectional illustration of a screening device according to the invention that is produced according to a method according to the invention, with bar holder packages provided between the ferrules.

Referring now to FIG. 1 there is shown a design of an inventive screening device 10 that is produced with a method according to the invention, for example a screen basket for a pressure screen that can be utilized in the paper industry.

Screening device 10 includes a multitude of profiled bars 12, only one of which is recognizable in the current example. These profiled bars 12 are inserted, wedged, parallel to one another into recesses in first strip-like bar holders 14 that are open on the edges, the two abutment ends of which are firmly connected with one another, in particular are welded together.

In addition to first bar holders 14 at least one additional strip-like bar holder 16 is provided that has recesses that are open on the edges and that is bent into a ring, and whose radial height $h_{16}$ is less than radial height h14 of the respective first bar holder 14.

First bar holders 14 and additional bar holders 16 associated therewith form bar holder packages 18 consisting of one first bar holder 14 and at of at least one additional bar holder 16, located immediately adjacent in axial direction A of the screening device 10.

Profiled bars 12 are inserted, wedged parallel to one another into the recesses of bar holder packages 18 that are open at the edges, whereby profiled bars 12 are also wedged into the recesses of additional bar holders 16. The bent over bar holder packages 18 are firmly connected with one another at both their abutment ends, for example by welding.

To produce such a rotationally symmetrical, for example, cylindrical screening device 10, first strip-like bar holders 14 are produced whose shape deviates from the subsequent annular shape in finished screening device 10 and which is provided with recesses that are open at the edges into which profiled bars 12 can be inserted.

Profiled bars 12 are inserted parallel to one another into the recesses of first bar holders 14 that are open at the edges. Rings are produced by bending of profiled bars 12 that are fitted with first bar holders 14. Profiled bars 12 are wedged in to the recesses that narrowed due to bending. After bending, first bar holders 14 are firmly connected with one another at their abutment ends, for example, by welding.

According to the invention at least one additional respective strip-like bar holder 16 having recesses that are open at the edges is produced in addition to the first strip-like bar holders 14, whose shape deviates from the later annular shape in the finished screening device 10 and whose height $h_{16}$, measured in radial direction of the later annular shape is less than the height $h_{14}$ of the respective first bar holder 14. First strip-like bar holders 14 and additional strip-like bar holders 16 associated therewith are used to form bar holder packages 18, each including respectively of one first strip-like bar holder 14 and at least one additional strip-like bar holder 16 that directly adjoins therefrom in axial direction A of the finished screening device 10.

Profiled bars 12 are inserted parallel to one another into the recesses of bar holder packages 18 that are open at the edges. When first bar holders 14 are bent, additional bar holders 16 are bent at the same time. Profiled bars 12 are thereby also wedged in the recesses of additional bar holders 16 due to the narrowing of these additional bar holders 16.

After bending, bar holder packages 18 are firmly connected with one another at both their abutment ends, for example by welding.

First strip-like bar holders 14 are bent into rings by bending devices 20 and additional strip-like bar holders 16 that are associated with the first strip-like bar holders 14 are dragged along via profiled bars 12 that are inserted into the recesses of the bar holder packages 18 that are open on the edges and are thus also be bent into rings. First strip-like bar holders 14 are hereby now wedged into bending devices 20 when being bent into rings.

Due to the lower height of the inertia ring-bar holders 16 the thus created screen mat can for example be pre-shaped quite normally on a 3-roll mill with grooves that are introduced for bar holders or bearers. The screen mat may possibly also fit into hydraulic cylinder packages of a bending-/welding machine by which the screen ends of higher first bar holders 14 can for example be held hydraulically, pulled together under tension and welded.

As already mentioned, additional bar holders 16 of lower height are thereby "dragged along".

Due to the difference in length created herein as a result of the different neutral fibers, different wedging and a "distortion effect" may occur at the strip package. Also, between the, for example, laser cut profiled bar groove and the profiled bars, length changes of different dimensions may occur, leading to a mutual distortion. Due to this effect and the additional greater bearer thickness, an extremely stable screen basket having high clamping force is the result.

Bending devices 20 may also include rolls with grooves or similar devices.

Figure 2:
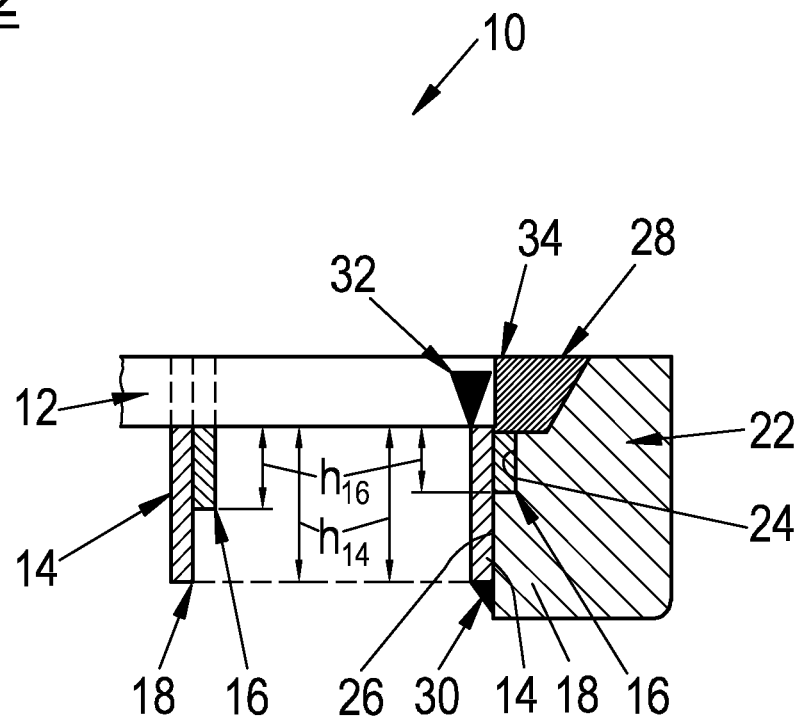
FIG. 2 is a schematic sectional illustration of a screening device according to the invention that is produced according to a method according to the invention, with bar holder packages provided between in the region of the ferrules.

Referring now to FIG. 2 there is shown an embodiment of an inventive screening device 10 that is produced according to a method according to the invention, with bar holder packages 18 provided in the region of ferrules 22, whereby in the current example only the end section of screening device 10 is depicted.

Screening device 10, for example a screen basket for a pressure screen that can be utilized in the paper industry again comprises a plurality of profiled bars 12 that are inserted parallel to one another, wedged into recesses that are open at the edges of first strip-like bar holders 14 that are bent into rings, whose two abutment ends are connected firmly with one another, preferably by welding.

In addition to the two first bar holders 14 that are positioned the region of a respective face side ferrule 22 of the screening device 10 there may be one additional bar holder 16 that is bent into a ring and which has recesses that are open on the edges according to the present invention, whose radial height $h_{16}$ is less than the radial height h14 of the respective first bar holder 14.

Respective first bar holders 14 and additional bar holders 16 associated therewith are herein used to form bar holder packages 18, each consisting of one first bar holder 14 and one additional bar holder 16 that directly adjoins or is spaced apart therefrom at a certain distance in axial direction A, located between first bar holder 14 and respective ferrule 22.

Profiled bars 12 are inserted parallel to each other into the recesses of bar holder 18 that are open at the edges and wedged, whereby profiled bars 12 are also wedged in the narrowed recesses of additional bar holders 16 that are bent into rings. Bent bar holder packages 18 are firmly connected with one another at both their abutment ends, for example by welding.

Additional bar holder 16 of a respective bar holder package 18 in the region of a respective ferrule 22 is fitted backlash-free into an indentation of the respective ferrule 22 and is welded together with the ferrule 22. In the region of a respective ferrule 22, first bar holder 14 of a respective bar holder package 18 is in contact with inside face 26 of the respective ferrule 22 and is welded together with the ferrule 22 in the region of its edge facing away from the profiled bars 12.

The profiled bars 12 may be inserted for example on the inside edge of bar holders 14, 16. In such a case, the screening device 10 may be intended for centrifugal operation, whereby the suspension flow is directed from the inside to the outside. Additional bar holder 16 of a respective bar holder package 18 that is provided in a region of a ferrule 22 is connected through welding with respective ferrule 22 via a welding seam 28 in the region of the inside diameter of the respective ferrule 22, and the first bar holder 14 of such a bar holder package 18 via a seal seam 30 in the region of its outside diameter.

In the current example at least one additional bar holder package 18 is also provided between bar holder packages 18 that are provided in the region of ferrules 22, that may be designed and produced in the manner previously described. However, designs of screening device 10 are also conceivable, wherein only in the region of the ferrules 22 such bar holder packages 18 with additional bar holders 16 allocated to the first bar holders may be provided.

In the design of the screening device 10 described last, or respectively the ferrule connection, the heat affected zone 34 of the main welding seam penetrates deeper into the ferrule 22, and the deforming force of profiled bars 12 acts more strongly during operation in the screening device upon the non-welded wedging point 32 in the strip package or on the first bearer or bar holder 14 of greater or normal height. The welding seam is hereby clearly relieved, whereby also the notch effect is less effective due to a clearly reduced load.

To produce such a rotationally symmetrical, for example, a cylindrical screening device 10 of the type illustrated in FIG. 2, first bar holders 14 are produced, the shape of which deviates from the subsequent annular shape in the finished screening device 10 and which have recesses that are open at the edges into which profiled bars 12 can be inserted. Profiled bars 12 are inserted parallel to one another into the recesses that are open at the edge of first bar holders 14. Rings are produced via bending from first bar holders 14 that are fitted with profiled bars 12. Bending results in profiled bars 12 being wedged in these narrowing recesses. After bending, first bar holders 14 are firmly connected to one another at their abutment ends.

In addition to the two first strip-like bar holders 14 that are to be positioned in finished screening device 10 in the region of a respective face side ferrule 22 of the screening device 10, there may be one additional strip-like bar holder 16 with recesses that are open on the edges according to the invention whose shape deviates from the subsequent annular shape in finished the screening device 10, and whose height h16 measured in radial direction of the subsequent annular shape is less than height h14 of respective first bar holder 14.

Bar holder packages 18 are formed from respective first strip-like bar holders 14 and additional strip-like bar holders 16 associated therewith, each consisting of one first strip-like bar holder 14 and one further strip-like bar holder 16 that directly adjoins the first strip-like bar holder 14 in axial direction A of the finished screening device 10, located between first strip-like bar holder 14 and respective ferrule 22.

Profiled bars 12 are inserted parallel to each other into the recesses of bar holder packages 18 that are open at the edges. By bending the first bar holders 14, the additional bar holders 16 are bent at the same time, thereby wedging profiled bars 12 also in the recesses of the additional bar holders 16 due to the narrowing of these additional bar holders 16.

After bending, bar holder packages 18 are firmly connected with one another at their abutment ends, for example by welding. Additional bar holder 16 of a respective bar holder package 18 is subsequently fitted backlash-free into an indentation of the respective ferrule 22 and is welded together with the ferrule 22. First bar holder 14 of a respective bar holder package 18 is in contact with inside face 26 of the respective ferrule and is welded together with ferrule 22 in the region of its edge facing away from profiled bars 12.

For the production of a centrifugally operated screening device 10 with profiled bars 12 that are inserted on the inside edge of bar holders 14, 16, additional bar holder 16 of a respective bar holder package 18 can be welded together with the respective ferrule 22 by a welding seam 28 in the region of the inside diameter of respective ferrule 22, and first bar holder 14 of a respective bar holder package 18 via a seal seam 30 in the region of its outside diameter.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LIST 10 screening device
12 profiled bar
14 first bar holder
16 additional bar holder
18 bar holder package
20 bending device
22 ferrule
24 indentation
26 face
28 welding seam
30 seal seam
32 wedging point
34 heat affected zone
A axial direction
$h_{14}$ radial height
$h_{16}$ radial height

What is claimed is:

1. A method for producing a screening device, the method comprising the steps of:
providing a screening device that includes:
a plurality of profiled bars; and
a plurality of bar holder packages associated with the plurality of profiled bars, said plurality of bar holder packages including:
a plurality of first bar holders that have a height, a shape which deviates from a subsequent annular shape of the screening device, and include a plurality of recesses for receiving the plurality of profiled bars; and
at least one additional bar holder associated with the plurality of first bar holders that has a height, measured in a radial direction of the subsequent annular shape of the screening device, that is less than the height of the plurality of first bar holders, a shape which deviates from the subsequent annular shape of the screening device, and includes at least one recess for receiving at least one of the plurality of profiled bars;
inserting the plurality of profiled bars parallel to one another into the plurality of bar holder packages; and
bending the plurality of bar holder packages such that the plurality of first bar holders and the at least one additional bar holder are bent at the same time, whereby the plurality of profiled bars become wedged into the plurality of recesses of the plurality of first bar holders and into the at least one recess of the at least one additional bar holder, and in that after bending the plurality of bar holder packages, a pair of abutment ends of the plurality of bar holder packages are firmly connected with one another.

2. The method of claim 1, wherein at least one of said plurality of bar holder packages is formed from one first bar holder and one additional bar holder.

3. The method of claim 1, wherein at least one of said plurality of bar holder packages is formed from one first bar holder and two additional bar holders.

4. The method of claim 1, wherein said plurality of first bar holders and said at least one additional bar holder are laser cut.

5. The method of claim 1, wherein said plurality of first bar holders and said at least one additional bar holder of at least one of said plurality of bar holder packages are produced from the same material.

6. The method of claim 1, wherein said plurality of first bar holders and said at least one additional bar holder of at least one of said plurality of bar holder packages are produced at least partially from a different material.

7. The method of claim 1, wherein said plurality of first bar holders and said at least one additional bar holder of at least one of said plurality of bar holder packages each have a respective thickness that is the same thickness measured in an axial direction of a finished screening device.

8. The method of claim 1, wherein said plurality of first bar holders and said at least one additional bar holder of at least one of said plurality of bar holder packages each have a respective thickness that is the same thickness, at least partially, measured in an axial direction of a finished screening device.

9. The method of claim 1, wherein said plurality of first bar holders are bent into a plurality of rings by a plurality of bending devices, and said at least one additional bar holder, which is associated with said plurality of first bar holders, is dragged along via said plurality profiled bars that are inserted into said plurality of bar holder packages and thus is also be bent into at least one of a plurality rings.

10. The method of claim 9, wherein said plurality of first bar holders are wedged into said plurality of bending devices when being bent into the plurality of rings.

11. The method of claim 1, wherein said plurality of bar holder packages is connected with one another at their said pair of abutment ends by welding.

12. The method of claim 1, additionally including a bending and welding machine that bends said plurality of bar holder packages and joins said pair of abutment ends of said plurality of bar holder packages.

13. A method for producing a screening device, the method comprising the steps of:
providing a screening device that has a respective face side ferrule and includes:

a plurality of profiled bars; and
a plurality of holder packages associated with the plurality of profiled bars, said plurality of bar holder packages including:
  at least one first bar holder positioned in said screening device in a region of the respective face side ferrule of the screening device, the at least one first bar holder has a height, a shape which deviates from a subsequent annular shape of the screening device, and includes at least one recess for receiving at least one of the plurality of profiled bars; and
  at least one additional bar holder adjoining the at least one first bar holder in an axial direction of the screening device and located between said at least one first bar holder and said respective face side ferrule, the at least one additional bar holder has a height measured in a radial direction of the subsequent annular shape of the screening device that is less than the height of the at least one first bar holder, a shape which deviates from the subsequent annular shape of the screening device, and includes at least one recess for receiving at least one of the plurality of profiled bars;
inserting the plurality of profiled bars parallel to one another into the plurality of bar holder packages;
bending the plurality of bar holder packages such that the at least one first bar holder and the at least one additional bar holder are bent at the same time, whereby the plurality of profiled bars become wedged into the at least one recess of the at least one first bar holder and into the at least one recess of the at least one additional bar holder, and in that after bending the plurality of bar holder packages, a pair of abutment ends of the plurality of bar holder packages are firmly connected with one another;
fitting subsequently said at least one additional bar holder backlash-free into an indentation of said respective face side ferrule;
welding together said at least one additional bar holder with said respective face side ferrule; and
welding together said at least one first bar holder of the plurality of bar holder packages with said respective face side ferrule in the region of an edge of the respective face side ferrule that faces away from said plurality of profiled bars such that the at least one first bar holder is in contact with an inside face of said respective face side ferrule.

14. The method of claim 13, wherein for the production of a centrifugally operable screening device with said plurality of profiled bars that are inserted on a respective inside edge of said at least one first and additional bar holder, said at least one additional bar holder is welded together with said respective face side ferrule by a welding seam in a region of an inside diameter of said respective face side ferrule, and said at least one first bar holder is welded via a seal seam in a region of an outside diameter of said respective face side ferrule.

15. The method of claim 13, wherein the screening device is a screen basket for a pressure screen that can be utilized in the paper industry.

* * * * *

UNITED STATES PATENT AND TRADEMARK OFFICE
CERTIFICATE OF CORRECTION

PATENT NO. : 10,195,645 B2
APPLICATION NO. : 15/352093
DATED : February 5, 2019
INVENTOR(S) : Burger et al.

Page 1 of 1

It is certified that error appears in the above-identified patent and that said Letters Patent is hereby corrected as shown below:

In the Specification

Column 8
Line 23, delete "h14", and substitute therefore --$h_{14}$--.

Column 9
Line 50, delete "h14", and substitute therefore --$h_{14}$--.

Column 10
Line 55, delete "h16", and substitute therefore --$h_{16}$--; and
Line 56, delete "h14", and substitute therefore --$h_{14}$--.

Signed and Sealed this
Third Day of November, 2020

Andrei Iancu
*Director of the United States Patent and Trademark Office*